(12) United States Patent
Taheri

(10) Patent No.: US 7,716,609 B1
(45) Date of Patent: May 11, 2010

(54) METHOD OF CIRCUIT OPTIMIZATION UTILIZING PROGRAMMABLE SLEEP TRANSISTORS

(75) Inventor: Babak Taheri, San Francisco, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 478 days.

(21) Appl. No.: 11/588,380

(22) Filed: Oct. 26, 2006

Related U.S. Application Data

(60) Provisional application No. 60/731,518, filed on Oct. 28, 2005.

(51) Int. Cl.
*G06F 17/50* (2006.01)
(52) U.S. Cl. .................. 716/1; 716/2; 716/4; 716/5
(58) Field of Classification Search .......... 716/1–2, 716/4–5
See application file for complete search history.

(56) References Cited

U.S. PATENT DOCUMENTS 7,328,413 B2 * 2/2008 Kim et al. ............... 716/1

2006/0119393 A1 * 6/2006 Hua et al. ............... 326/121
2006/0206739 A1 * 9/2006 Kim et al. ............... 713/322
2007/0164785 A1 * 7/2007 He ......................... 326/41

OTHER PUBLICATIONS

Tadahiro Kuroda and Motosugu Hamada, "Low-Power CMOS Digital Design with Dual Embedded Adaptive Power Supplies", IEEE Journal of Solid-State Circuits, vol. 35, No. 4, Apr. 2000. pp. 652-655.
Yibin Ye et al., "A New Technique for Standby Leakage Reduction in High-Performance Circuits," Symposium on VLSI Circuits Digest of Technical Papers, Jun. 1998, pp. 40-41; 2 pages.

* cited by examiner

*Primary Examiner*—Paul Dinh

(57) ABSTRACT

Optimizing a circuit by calculating at least one parameter of a circuit based on a first size of at least one sleep transistor, calculating at least one parameter of the logic circuit based on a second size of the at least one sleep transistor. This process may be repeated for different sizes of the at least one sleep transistor to determine an optimum size of the at least one sleep transistor to optimize at least one parameter of the logic circuit.

17 Claims, 9 Drawing Sheets

| W/L = 30/5 | |
|---|---|
| Tpd (ns) | 4.94 |
| ILK (nA)- 100 G | 4.82E-05 |
| ILK (nA)- 25 Kg | 1.21E-02 |
| Area Increase (w.r.t nand2) | ~26% |
| W/L = 7.5 /1 | |
| Tpd (ns) | 4.92 |
| ILK (nA)- 100 G | 3.87E-05 |
| ILK (nA)- 25 Kg | 9.68E-03 |
| Area Increase (w.r.t nand2) | ~1.2% |

METHOD OF CIRCUIT OPTIMIZATION UTILIZING PROGRAMMABLE SLEEP TRANSISTORS

CROSS-REFERENCE TO RELATED APPLICATIONS

This application claims the benefit of priority of U.S. Provisional Patent Application No. 60/731,518 filed Oct. 28, 2005.

TECHNICAL FIELD

The present invention relates generally to electronic circuits, and in particular to low-power circuits.

BACKGROUND

Great progress has been made over the past decade reducing power in integrated circuits while increasing the amount of signal processing. Historically power reduction has been achieved through voltage scaling, reduced capacitance, and innovative circuits and architectures. Shrinking feature sizes below 90 nm has resulted in proportional reductions in voltage and capacitance, while increasing static power consumption. The static power consumption in complementary metal oxide semiconductor (CMOS) process emanates from several leakage currents in transistors. The lower threshold voltages, thinner gate oxides, narrower field effect transistor (FET) channels, and high die temperatures drive sub threshold currents higher. The following conventional examples show the contribution of leakage power to total power for high performance conventional microprocessors:

For an Intel® 0.18 um technology, leakage power is approximately 10% of total power.

For an Intel® 0.13 um technology, leakage power is approximately 25% of total power.

For an Intel® 0.09 um technology, leakage power is approximately 50% of total power.

The leakage currents increase as a strong function of temperature. The major contributors to FET leakage current include P-N junction leakage, gate-induced drain leakage (GIDL), drain-induced barrier lowering (DIBL), punch through narrow width effect, weak inversion (sub threshold leakage), gate oxide tunneling, and hot carrier injection. For 65 nm and 45 nm technology nodes, sub threshold leakage is the dominant contributor and hence the primary candidate for design and process technology improvements. As technology nodes go below the 90 nm barrier, the leakage current dominates the power consumption of the integrated circuits (ICs), limiting the applications in mobile products where battery life is critical.

Conventional solutions for leakage control in digital logic design include multi-threshold CMOS (MTCMOS), which utilizes high-threshold voltage (Vt) transistors to disconnect low-Vt transistors from the power supply (e.g., Vdd) and/or ground (Gnd). One sleep transistor can be shared between many gates to create this virtual Vdd/Gnd connection. Alternatively, sleep transistors may be used at gate level. The granularity of the sleep transistor implementation can vary based on several factors. The main advantage of this approach is disconnecting the leakage path from both the supply and ground.

One disadvantage of the conventional solution includes utilization of dual-Vt devices, requiring additional process steps. Another disadvantage of the conventional solution is that one or two very large sleep transistors are used, which impacts both the performance and die area/cost penalty. A further disadvantage of the conventional solution includes reverse conduction through virtual ground and virtual power. Reverse conduction occurs where the drain of the transistor is more positive than the source. In addition, having two sleep transistors (e.g., a PMOS to shut off Vdd, and NMOS to disconnect from ground) degrades speed and reduces overhead voltage. In addition, the PMOS on-resistance (Ron) is usually 2 to 3 times larger than the NMOS on-resistance and, hence, either an asymmetrical rise time (tr) and fall time (tf) of the signal results. In order to compensate for this asymmetry with rise and fall times, a larger PMOS transistor is typically used, thus increasing the overall area of the circuit. Another disadvantage of the conventional solution is that of dependency of sleep transistor sizing to the data pattern loaded on the logic circuit. The data pattern of the logic circuit may include worst case parameters such as activity level or propagation delay of the circuit. As a result simulating the circuit under all possible input values may be an extremely difficult task, especially for large circuits.

There is no specific methodology for device size optimization that takes into account active mode power, propagation delay, turn-on time, turn-off time, activity factor, and sleep mode leakage. There is also no conventional technology to automate such digital logic design.

BRIEF DESCRIPTION OF THE DRAWINGS

Embodiments of the present invention are illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the spirit and scope of the present invention.

Embodiments of an optimization method are described. In one embodiment, the method includes calculating at least one parameter of a circuit based on a first size of at least one sleep transistor, calculating at least one parameter of the circuit based on a second size of the at least one sleep transistor and determining an optimum size of the at least one sleep transistor to optimize the at least one parameter of the circuit. Other embodiments are also described.

Embodiments of an apparatus are also described. In one embodiment, the apparatus includes a means for optimizing at least one parameter of a circuit including, a means for choosing an activity level and propagation delay range of the circuit and a means for choosing power, leakage and area associated with the circuit. The apparatus further includes a means for iteratively calculating at least one parameter of the circuit in order to optimize at least one parameter of the circuit. The details of this embodiment and other embodiments are also described.

Figure 1:
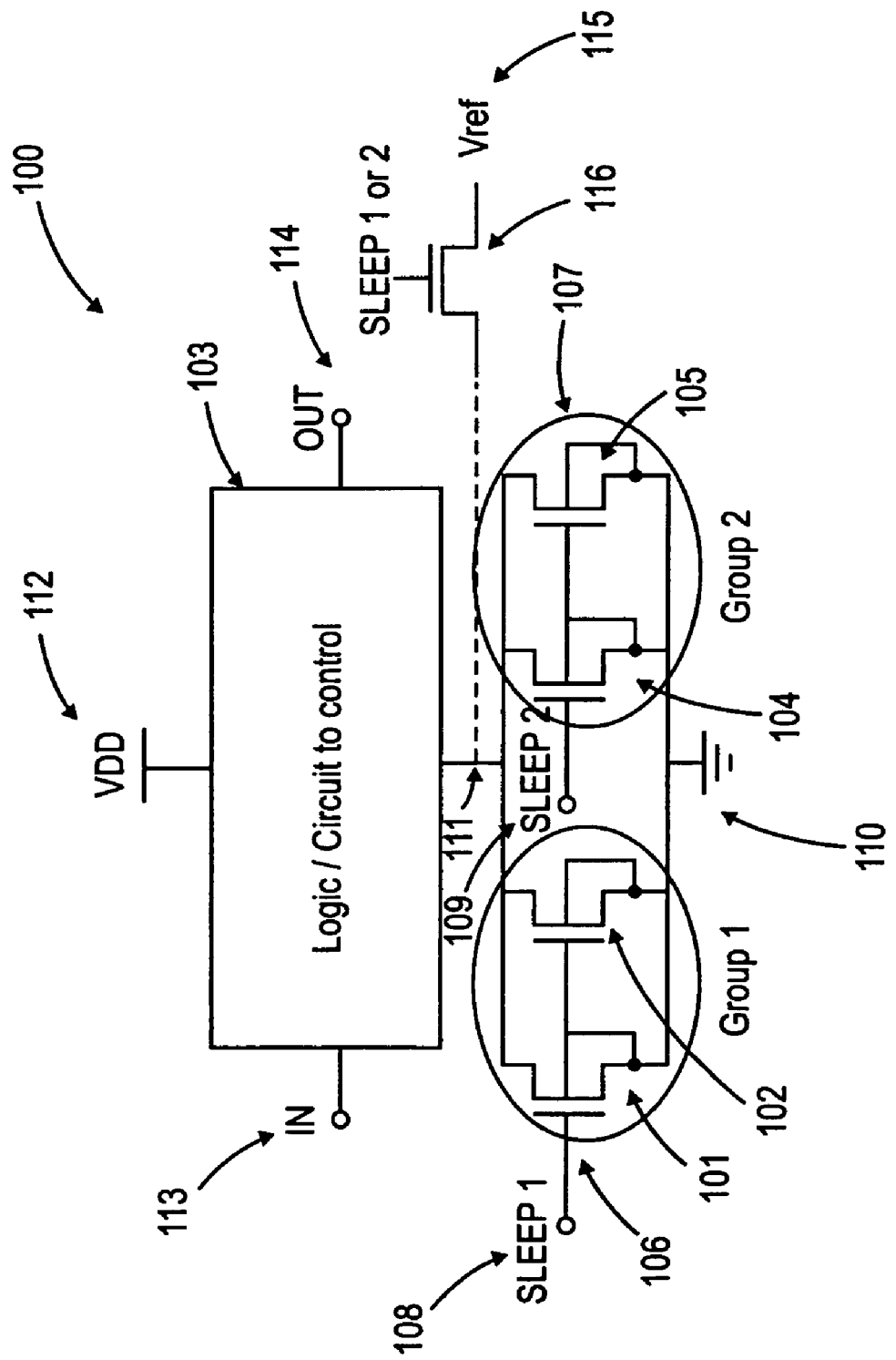
FIG. 1 illustrates one embodiment of a sleep transistor circuit.

FIG. 1 illustrates an embodiment of a sleep transistor circuit 100. In this embodiment, multiple sleep transistors 101, 102, 104, and 105 are coupled to a circuit 103. For convenience, references herein to one or more of the sleep transistors 101, 102, 104, and 105 are intended to apply to all of the sleep transistors 101, 102, 104, and 105, unless noted otherwise. The sizes of the sleep transistors 101, 102, 104, and 105 are optimized to optimize certain parameters of the circuit 103. For example, the sleep transistors 101, 102, 104, and 105 may be optimized to minimize sub threshold leakage, optimize power, or optimize delay of the circuit 103, with consideration of the area of the circuit 103. The circuit 103 may be an analog, digital or radio frequency (RF) circuit. For convenience, many references herein refer to a logic circuit 103, but such references may be applicable to other types of circuits as well.

In one embodiment, the sleep transistor 102 may be programmable. In one embodiment, the sleep transistor 102 may have a resistance that can be variable to tune in some of the parameters of the circuit 103. For example, the programmable sleep transistor 102 may be tuned to change the propagation delay or current leakage of the circuit 103. In the embodiment illustrated in FIG. 1, at least one parameter of the programmable sleep transistor 102 may be optimized. Changing the parameters of the sleep transistor 102 may result in a change of at least one parameter of the logic circuit 103. In an embodiment, the logic circuit 103 may be optimized by calculating at least one parameter of the logic circuit 103 based on a first size of at least one sleep transistor 102, then calculating at least one parameter of the logic circuit 103 based on a second size of the at least one sleep transistor 102. This process may be repeated for different sizes of the at least one sleep transistor 102 to determine an optimum size of the at least one sleep transistor 102 to optimize the logic circuit 103.

In another embodiment, the circuit 100 may include parallel sleep transistors 101, 102, 104, 105 that may be arranged in groups of sleep transistors 106, 107, and the transistors 101, 102, 104, 105 are optimized to allow dynamic or static control of active power and delay associated with the logic circuit 103. Dynamic power control may minimize dissipation of power in logic gates that are in the process of switching from one state to another, while static power control may minimize power dissipation in logic gates when the logic agates are inactive. In an embodiment, at least one group of the sleep transistors 106 is configured for active mode and at least one group of the sleep transistors 107 is configured for sleep mode. The active mode sleep transistors 106 may be optimized for power, propagation delay and for activity levels. The sleep mode sleep transistors 107 may be optimized for leakage control and for sleep to active mode transition time. In an embodiment, the parallel sleep transistors 101, 102, 104, 105 that are grouped together may be parallel NMOS transistors. In an embodiment, the parallel sleep transistors 101, 102, 104, 105 that are grouped together are arranged in regular arrays that are optimized as per the algorithm. In another embodiment, as illustrated in FIG. 1, the circuit may have a first pair of sleep transistors 106 and a second pair of sleep transistors 107. The first pair of sleep transistor 106 may be gated by a first sleep signal (SLEEP 1) 108 and the second pair of sleep transistor 107 may be gated by a second sleep signal (SLEEP 2) 109. The first pair of sleep transistors 106 may be used when sleep mode 1 is active and the second pair of sleep transistors may be used for sleep mode 2 (another power saving mode) or may be used to overdrive the first sleep signal 108 or the second sleep signal 109. In one embodiment, overdrive is used by setting a logic value of "1" instead of using analog signal levels. The first and second pair of sleep transistors 106, 107 may be coupled between ground 110 and a node 111 coupled to the logic circuit 103 to be controlled. The logic circuit 103 to be controlled may be coupled to power (Vdd) 112 and may have input and output signals 113, 114. A reference voltage (Vref) 115 may be coupled through at least one pass transistor 116, and the at least one pass transistor 116 may be gated by the first sleep signal (SLEEP 1) 108 or the second sleep signal (SLEEP 2) 109 and the pass transistor 116 may be coupled to the node 111 that may also be coupled with the logic circuit 103. In one embodiment, the pass transistor 116 controls the virtual ground between the logic circuit 103 and the first and second pair of sleep transistors 106, 107 to avoid reverse conduction problems through virtual ground. The pass transistor 116 may be a programmable sleep transistor. In another embodiment, the circuits may use a single or dual threshold voltage (Vt) process. For a Vt process, especially for a single Vt process, the width and length (W/L) of the sleep transistor 102 may be optimized for leakage. The width and length of the sleep transistors 101, 102, 104, 105 may be optimized to minimize sub threshold leakage or other parameters of the logic circuit 103 such as power, delay, on/off time and activity factor. The activity factor is the fraction of gates switching simultaneously. In an embodiment, the size of the programmable sleep transistor 101, 102, 104, 105 is optimized and scalable depending on the density of the logic circuit it controls.

Figures 2, 3:
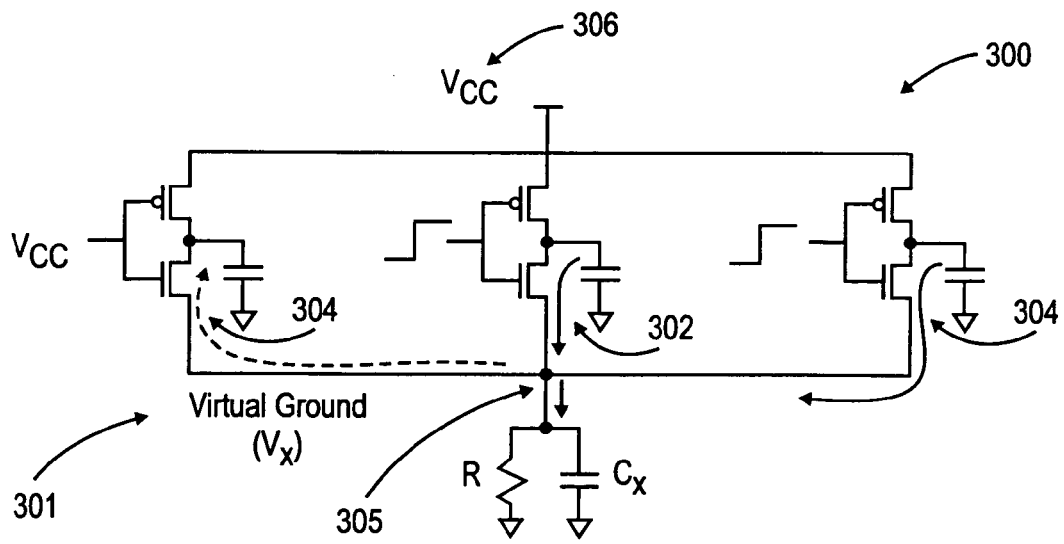
FIG. 2 is a table illustrating performance of the sleep transistor circuit of FIG. 1 with different transistor sizing.
FIG. 3 illustrates reverse conduction in another embodiment of a sleep transistor circuit.

FIG. 2 is a table 200 illustrating performance of the circuit with different sleep transistor sizing. The table 200 compares two different drive strengths (W/L) of the sleep transistor 102. The term drive strength is related to the electrical load a circuit is intended to handle and it can be adjusted by sizing the transistor's width and length. For a drive strength of 30/5, the propagation delay is longer compared to a drive strength of 7.5/1, as illustrated in the FIG. 2. The leakage current per weight also varies with the drive strength of the sleep transistor 102. As illustrated in FIG. 2, the leakage current of a sleep transistor 102 with a drive strength of 30/5 is more than that of the sleep transistor 102 with a drive strength of 7.5/1, and the increase in area of the circuit with respect to the gate is significantly higher for the drive strength of 30/5.

FIG. 3 illustrates reverse conduction in a sleep circuit 300. In the embodiment shown in FIG. 3, since virtual ground is not at zero volts, depending on the input data at each inverter, the output of each gate can source current to the virtual ground 301. As shown in FIG. 3, the last two gates in the chain 302, 303, contribute current to the virtual ground node 305 and the first gate 304 since the first gate's input is at the supply voltage (Vcc) 306, while the last two gates 302, 303 are in a transitioning state and may absorb some of the current from the virtual ground 301 causing interference. As shown in FIG. 1, the pass transistor 116 may be used to connect a voltage reference 115 to the node 111 in order to minimize and reduce reverse conduction.

Figure 4:
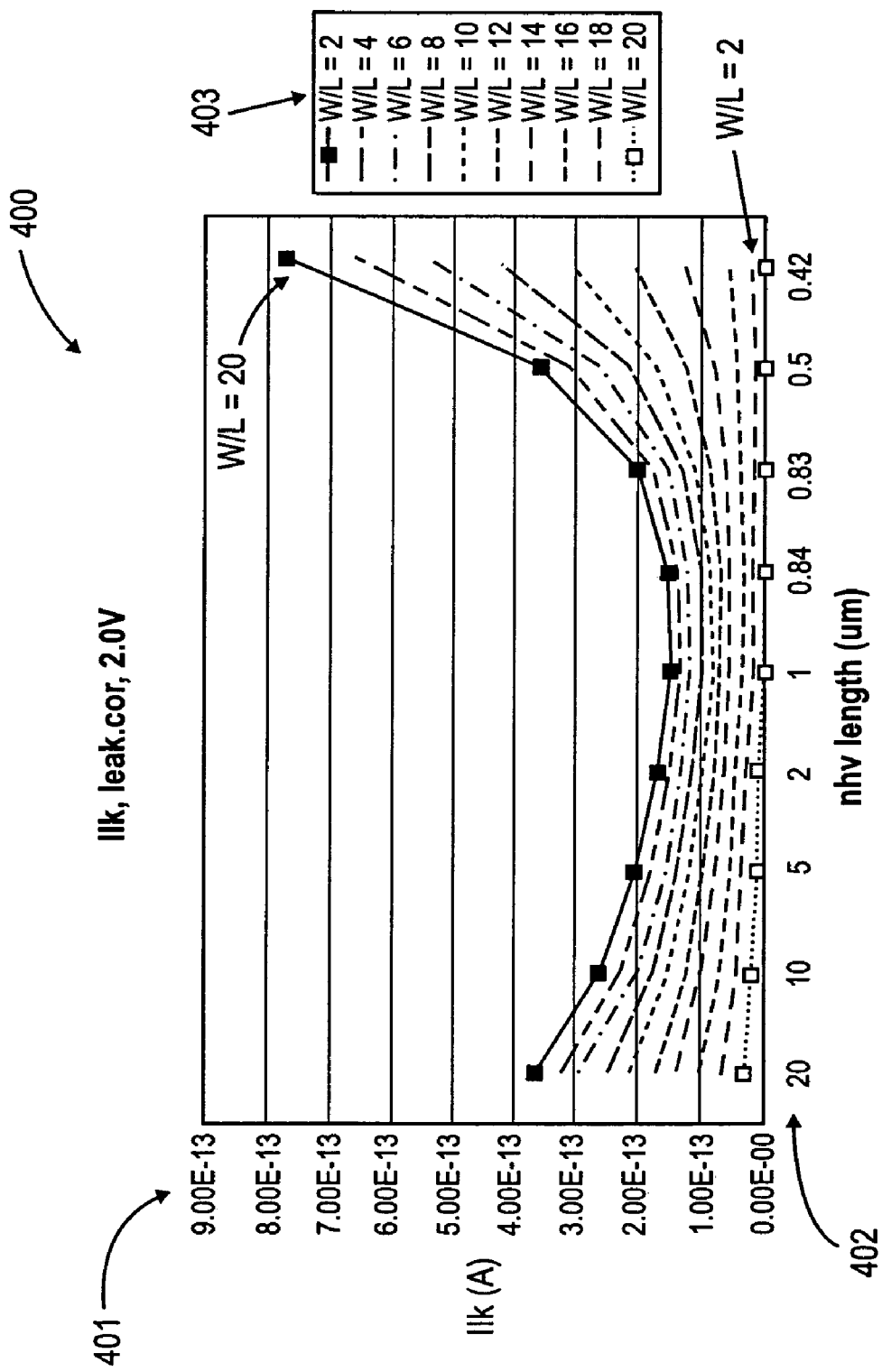
FIG. 4 is a graph illustrating leakage current versus transistor length of one embodiment of the sleep transistor circuit.

FIG. 4 is a graph 400 illustrating leakage current 401 versus transistor length 402. The graph 400 shows leakage of a thick oxide device, such as a NMOS high voltage (nhv) device, as a function of device length and ratio of W/L (drive strength) 403. FIG. 4 shows that the leakage of the sleep transistor 102 can dominate if minimum channel length or high drive strength is used. A user may run a simulation to optimize for leakage. As shown in FIG. 4, a first simulation is to characterize the leakage current to the sleep transistor 102, and shows the sleep transistor as a function of its length and the drive strength, which is the width to length ratio (W/L) of the device. The curve shows for example that for W/L ratios of 2, 4, 6 and 8 the leakage is minimum and flat over differing device lengths. But for larger W/L ratios the leakage increases. This simulation data allows for the selection of a low leakage device size.

Figure 5:
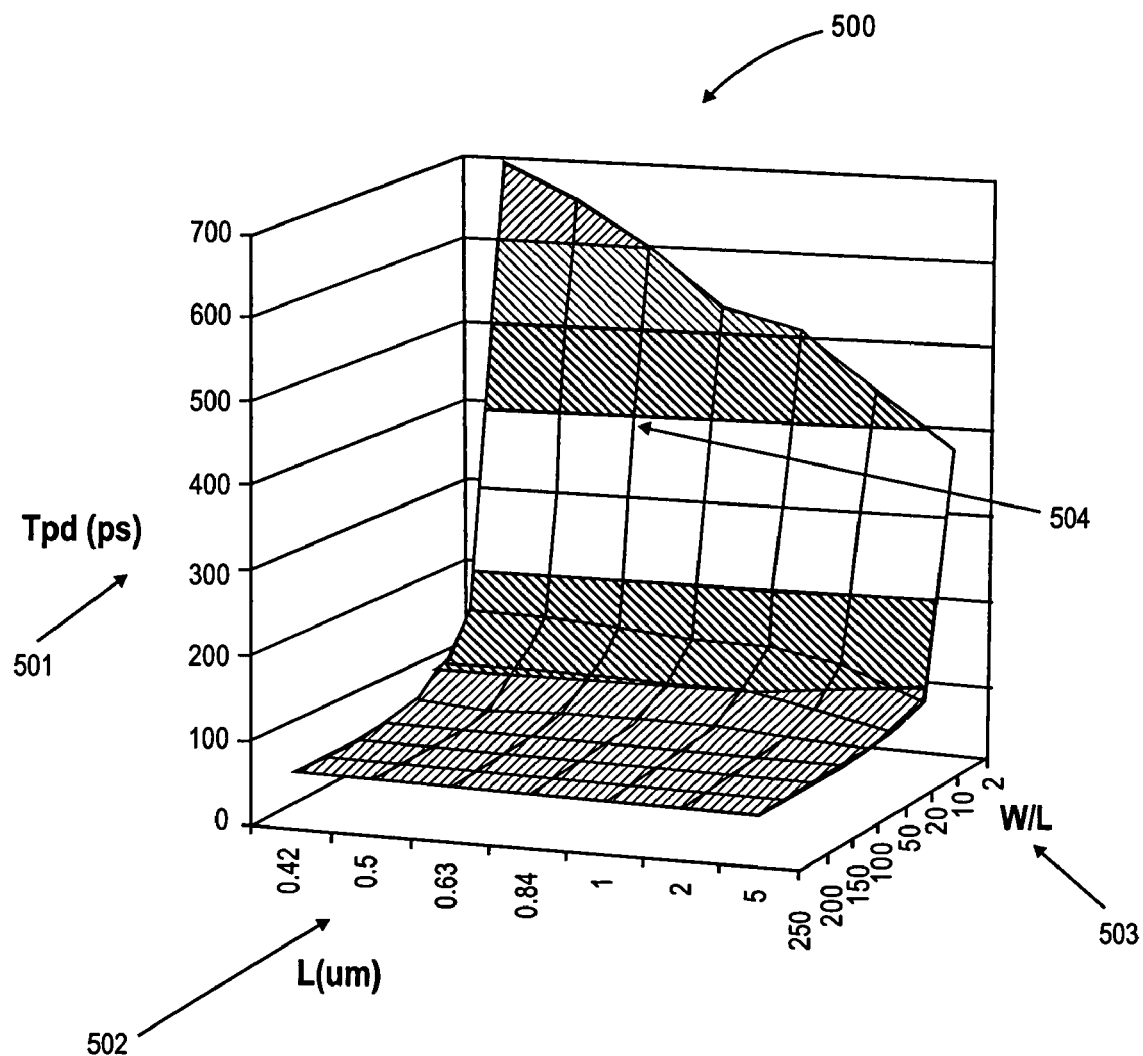
FIG. 5 is a graph illustrating logic gate propagation delay vs. sleep transistor length, and sleep transistor drive current determined by the width-to-length ratio (W/L) of the sleep transistor.

FIG. 5 is a graph 500 illustrating logic gate propagation delay vs. sleep transistor length, and sleep transistor drive current determined by the width-to-length ratio of the sleep transistor. FIG. 5 shows the propagation delay (tpd) 501 as function of length 502 and drive strength 503 of the sleep transistor. The propagation delay 501 here is the propagation delay of an equivalent 2-input NAND gate. Combined with FIG. 4 data, one can optimize the propagation delay alone or do further evaluation/optimization on other parameters. The "X" 504 in FIG. 5 shows where the propagation delay (tpd) of the gate is if no sleep transistor is used. In particular, the "X" marking identifies a position on the graph 500 which can be used as an example value for optimization. Here, "X" marks a propagation delay of 400 ps for an equivalent gate resulting from a sleep transistor length of 0.4 um and W/L of about 2. Historically no specific methodology is introduced for optimization of device sizes that takes into account all the parameters in both active and standby modes. These parameters include power, delay, turn-off time, activation, and turn-on time. FIG. 5 shows a simulation approach by which at least one parameter, in this case propagation delay, of the circuit may be optimized. The optimization of the propagation delay may be accomplished by optimizing the width and the width-to-length ratio (W/L) of a sleep transistor, such as a NMOS sleep transistor. FIG. 5 shows that a drive capacity which may be determined by width-to-length ratio (W/L) has a large effect on the propagation delay of the gates in the circuit.

The parallel sleep transistors may be placed in regular arrays that are optimized. The method of optimization includes choosing vector/activity level, choosing a propagation delay range, choosing desired power, leakage and area parameters, and then iterating to optimize size. Then the devices are placed in the layout operation. All the operations below lend themselves to automation where running different tools in a batch mode does the optimization. The optimization process may include the following.

Figure 9:
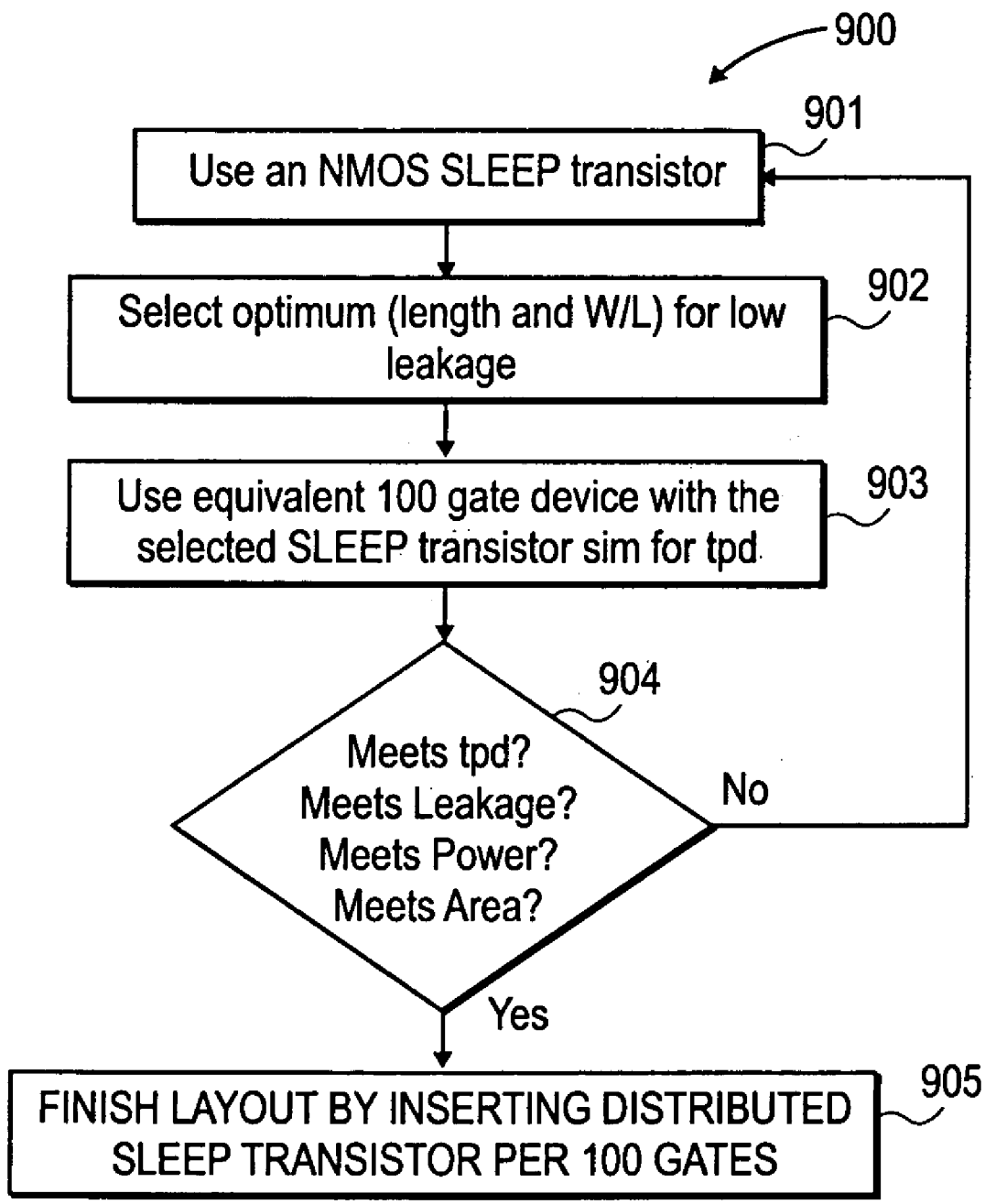
FIG. 9 is a flowchart illustrating one embodiment of a circuit optimization process.

FIG. 9 is a flowchart 900 illustrating one embodiment of a circuit optimization process. Among various embodiments, some operations may be removed or become optional. At operation 901, an NMOS sleep transistor may be used. As discussed the sleep transistors may be parallel and grouped. At operation 902, a selection of the sleep transistors are made based on optimum length and drive strength (W/L) for low leakage. This can be done by simulating and extracting the leakage current of the sleep transistor as a function of its length and drive strength (W/L). A graphical data example from this simulation is shown if FIG. 4. At operation 903, a 100 gate device with selected sleep transistors simulated for propagation delay may be used. A sleep transistor may be placed between the logic gates and ground as shown in FIG. 1. At the operation 904, it is determined whether all the parameters necessary for optimization of the circuit are optimized. If these parameters are not optimized the operation may be reverted back to operation 901. The parameters that are to be optimized include propagation delay, leakage, power and area. If the parameters are optimized, the operation proceeds to operation 905. At operation 905 the layout of the optimized circuit completed by inserting distributed sleep transistors per 100 gates.

Figure 6:
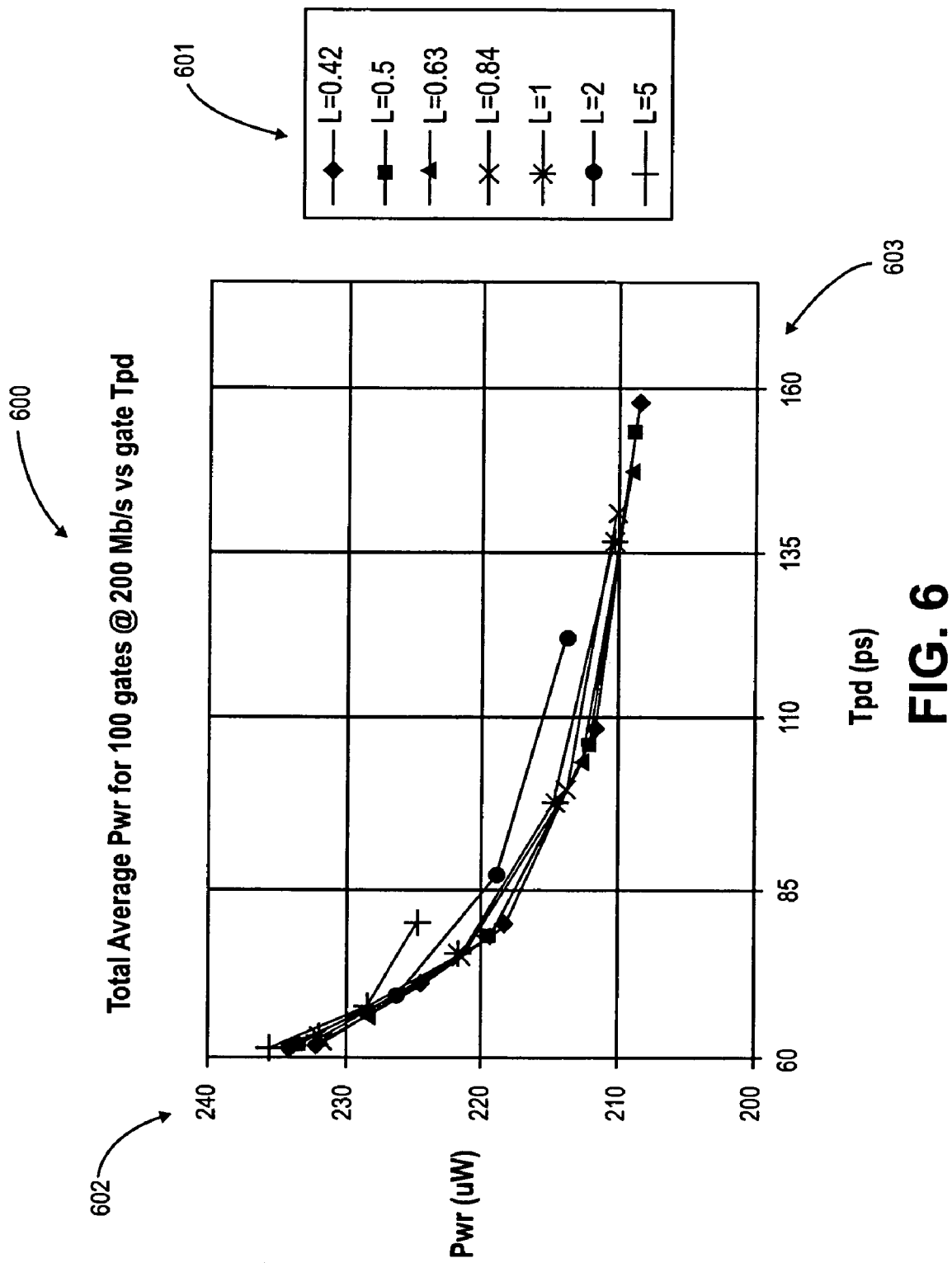
FIG. 6 is a graph illustrating power vs. propagation delay, showing how the logic propagation delay changes as a function of drive strength and length of one embodiment of a sleep transistor.
Figure 7:
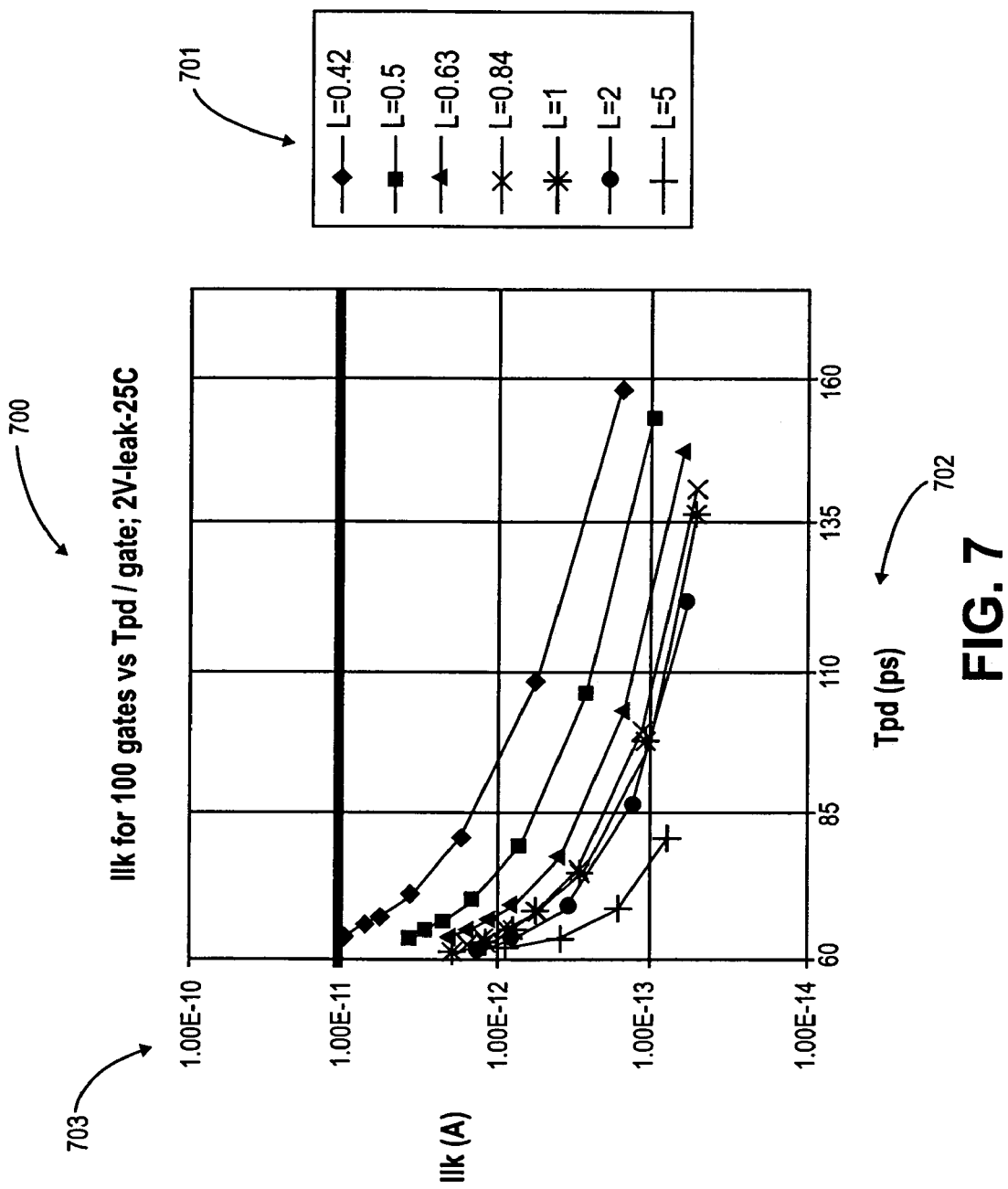
FIG. 7 is a graph illustrating logic gate leakage current vs. logic gate propagation delay, as a function of length/drive strength for one embodiment of a sleep transistor.
Figure 8:
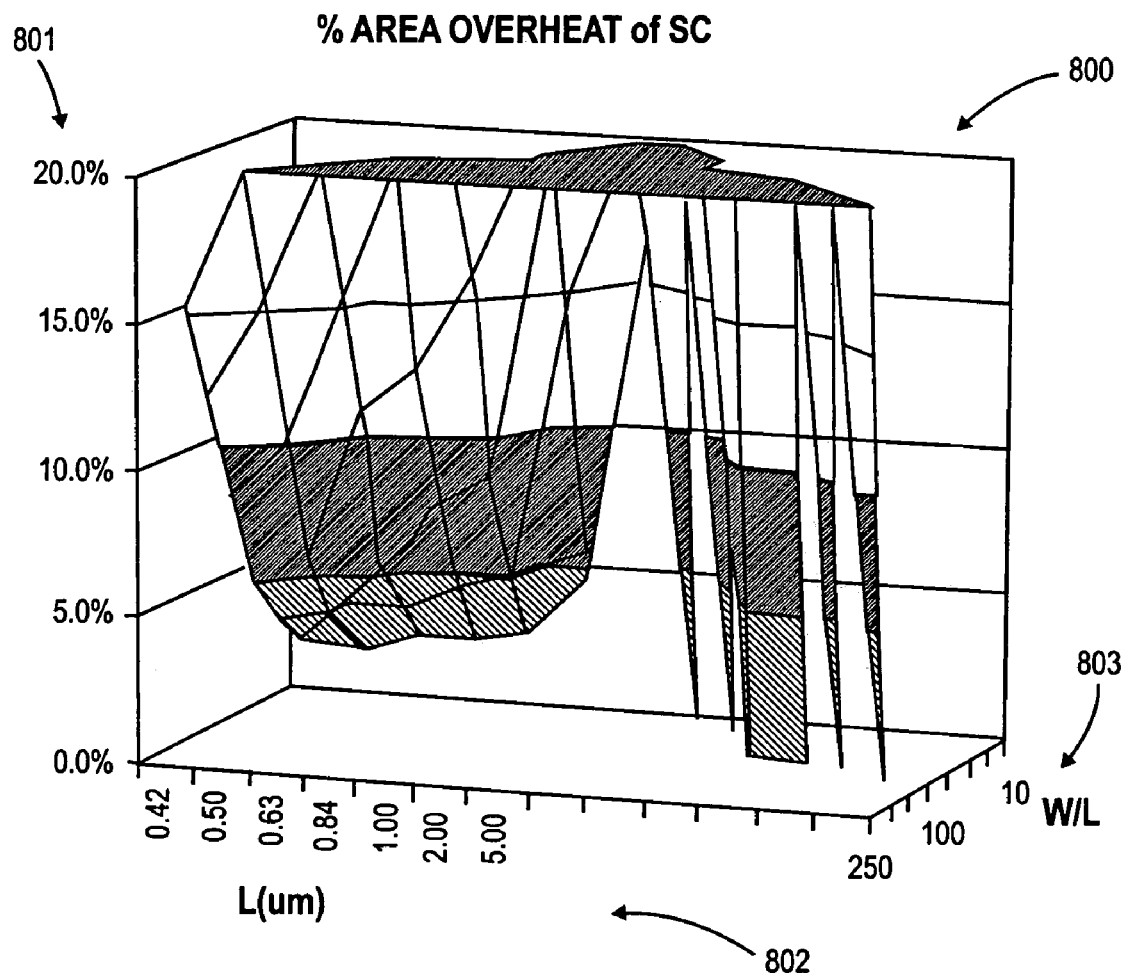
FIG. 8 is a graph illustrating a percentage area penalty vs. sleep transistor length vs. sleep transistor drive strength (W/L) for one embodiment of a sleep transistor.
Figure 10:
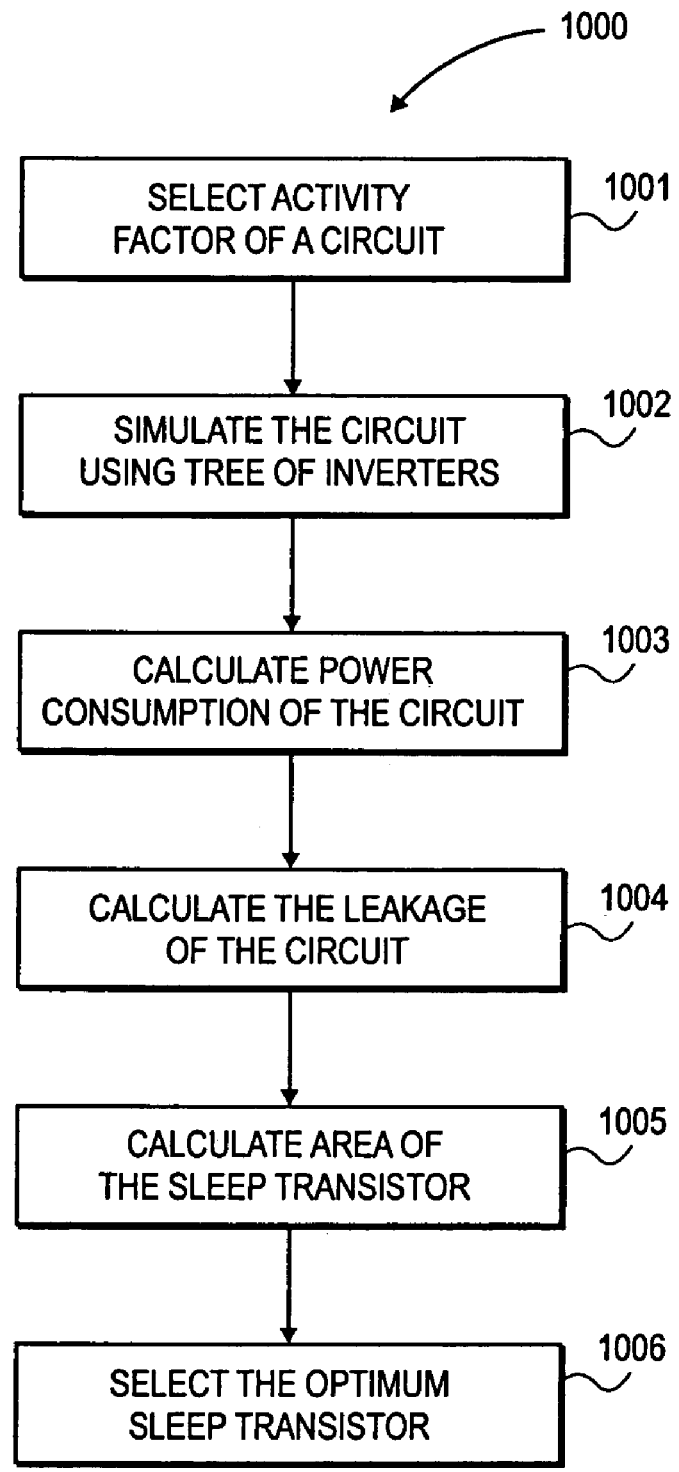
FIG. 10 is a flowchart illustrating one embodiment of an optimization method for size of a sleep transistor.

FIG. 10 is a flowchart illustrating one embodiment of an optimization method 100 for size of a sleep transistor 102. The size of sleep transistor 102 may be optimized in the following steps based on activity factor, power, leakage and area relative to the logic circuit. Grouping of sleep transistors may be done at the final operation. In operation 1001 the logic design activity factor may be chosen based on the worst vector/data conditions. This typically is not 100% activity rather 50 to 60% for most logic designs. This method may be used for 100 to 1000 equivalent gates and scaled upward. In operation 1002, simulate the circuit using trees of inverters for logic with connectivity representing the activity factor with inclusion of an NMOS sleep transistor. Vary lengths 502 and W/L 503 of a sleep transistor and simulate prop delay (tpd) 501 vs. L 502 vs. W/L 503. The logic size may be scaled linearly. In an embodiment, 100 inverters with activity factor of 54% may be selected. Ideally a representative net list of the circuit may be used instead of the inverter tree. A graphical representation 500 of the data is shown in FIG. 5, which illustrates propagation delay of logic gate 501 vs. sleep transistor length 502 and sleep transistor drive current 503 determined by width- to-length ratio of the sleep transistor. An "X" mark is placed on the graph, which represents an equivalent propagation delay when no sleep transistor is used. This point is used as a reference to see how propagation delay of logic gates change relative to it. The "X" marks the position of an exemplary optimization point where the propagation delay is not the most optimum parameter, but rather L and W/L are to optimize for drive and area. In operation 1003, calculate power consumption from the simulations of operation 1002. Compare the power consumption 602 of the device as a function of the propagation delay (tpd) 603 and size for sleep transistor 601. A graphical representation 600 of the data is shown in FIG. 6, which illustrates power 602 vs. propagation delay 603 showing how the circuit propagation delay changes as a function of length 601 of a sleep transistor. In operation 1004, calculate leakage from the simulations of operation 1002. Compare the leakage current 703 of the circuit (sleep transistor plus logic devices) as a function of the propagation delay (tpd) 702. A graphical representation 700 of the data is shown in FIG. 7, which illustrates a plot of leakage current 703 for the logic gates vs. propagation delay 702 for the logic gates as a function of length 701 for the sleep transistor 102. In operation 1005, calculate relative area of the sleep transistor to equivalent gates used in simulation of operation 1002. A graphical representation 800 of the data is shown in FIG. 8 illustrating a plot of the percentage area penalty 801 for the circuit gate versus the sleep transistor length 802 versus the sleep transistor drive strength (W/L) 803. In operation 1006, having the data from operation 1002 to 1005 choose the optimum sleep transistor size, depending on which parameter(s) are most relevant to the design.

Some embodiments of the optimization method reduce the size of the circuit and simplicity of design (no sequencing, very simple reference circuit). Some embodiments allow dynamic and static adjustment. Some embodiments prevent reverse conduction. In addition, some embodiments optimize for power, delay, area and leakage.

Embodiments of the present invention include various operations, which are described herein. These operations may be performed by hardware components, software, firmware, or a combination thereof. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

The digital processing device(s) described herein may include one or more general-purpose processing devices such as a microprocessor or central processing unit, a controller, or the like. Alternatively, the digital processing device may include one or more special-purpose processing devices such as a digital signal processor (DSP), an application specific integrated circuit (ASIC), a field programmable gate array (FPGA), or the like. In an alternative embodiment, for example, the digital processing device may be a network processor having multiple processors including a core unit and multiple microengines. Additionally, the digital processing device may include any combination of general-purpose processing device(s) and special-purpose processing device(s).

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

The invention claimed is:

1. A method comprising:
    calculating at least one parameter of a circuit based on a first size of at least one sleep transistor;
    calculating the at least one parameter of the circuit based on a second size of the at least one sleep transistor;
    simulating the at least one parameter of the circuit as a function of length and driver strength of the at least one sleep transistor; and
    determining, by a digital processing device, an optimum size of the at least one sleep transistor to optimize the at least one parameter of the circuit.

2. The method of claim 1, further comprising laying out an optimized circuit, wherein the optimized circuit comprises the at least one sleep transistor determined to have the optimum size.

3. The method of claim 1, wherein the at least one parameter of the circuit comprises leakage, transition time, propagation delay, area, activity factor or power.

4. The method of claim 3, further comprising choosing the activity factor of the circuit based on worst data conditions.

5. The method of claim 1, further comprising simulating leakage current of the circuit as a function of length and drive strength of the at least one sleep transistor.

6. The method of claim 1, further comprising simulating propagation delay of the circuit as a function of length and drive strength of the at least one sleep transistor.

7. The method of claim 1, further comprising simulating the circuit using trees of inverters, with the inverters coupled to represent an activity factor of the circuit, wherein the circuit includes the at least one sleep transistor.

8. The method of claim 1, wherein the at least one sleep transistor comprises a plurality of sleep transistors, the method further comprising grouping the plurality of sleep transistors into at least two groups.

9. The method of claim 1, further comprising coupling a pass transistor to a node associated with a virtual ground between the at least one sleep transistor and the circuit.

10. The method of claim 1, wherein determining the optimum size of the at least one sleep transistor comprises automatically determining the optimum size of the at least one sleep transistor by the digital processing device.

11. The method of claim 1, wherein the at least one sleep transistor comprises a programmable sleep transistor.

12. The method of claim 1, further comprising:
    choosing an activity level and a propagation delay range of the circuit, wherein the circuit is configured to be optimized by at least one sleep transistor;
    choosing a power, a leakage and an area associated with the circuit; and
    iteratively calculating several times to optimize the circuit by optimizing the size of the at least one sleep transistor.

13. An article of manufacture comprising a computer readable medium comprising executable computer program instructions, which when executed by a data processing system, cause the data processing system to perform the following:

calculate at least one parameter of a circuit based on a first size of at least one sleep transistor;

calculate the at least one parameter of the circuit based on a second size of the at least one sleep transistor;

simulate the at least one parameter of the circuit as a function of length and driver strength of the at least one sleep transistor; and determine an optimum size of the at least one sleep transistor to optimize the at least one parameter of the circuit.

14. The article of manufacture of claim 13, wherein the executable computer program further comprises instructions, which when executed by the data processing system, cause the data processing system to simulate leakage current of the circuit as a function of length and drive strength of the at least one sleep transistor.

15. The article of manufacture of claim 13, wherein the executable computer program further comprises instructions, which when executed by the data processing system, cause the data processing system to simulate propagation delay of the circuit as a function of length and drive strength of the at least one sleep transistor.

16. The article of manufacture of claim 13, wherein the executable computer program further comprises instructions, which when executed by the data processing system, cause the data processing system to simulate the circuit using trees of inverters, with the inverters coupled to represent an activity factor of the circuit, wherein the circuit includes the at least one sleep transistor.

17. The article of manufacture of claim 13, wherein the executable computer program further comprises instructions, which when executed by the data processing system, cause the data processing system to choose a circuit activity factor based on worst data conditions.

* * * * *